United States Patent [19]

Oka et al.

[11] Patent Number: 5,159,257
[45] Date of Patent: Oct. 27, 1992

[54] VEHICLE POWER SUPPLY APPARATUS FOR PROTECTING A BATTERY FROM EXCESSIVE DISCHARGE

[75] Inventors: Toshimitsu Oka; Rikuo Hatano, both of Aichi, Japan

[73] Assignee: Aisin Seiki K.K., Kariya, Japan

[21] Appl. No.: 661,148

[22] Filed: Feb. 27, 1991

[30] Foreign Application Priority Data

Feb. 27, 1990 [JP] Japan ................... 2-48442

[51] Int. Cl.[5] .................. H02G 3/00; H02H 7/18; H02J 7/00
[52] U.S. Cl. ................... 320/13; 307/10.7
[58] Field of Search ............ 320/13; 307/10.7

[56] References Cited

U.S. PATENT DOCUMENTS

| | | | |
|---|---|---|---|
| 4,493,001 | 1/1985 | Sheldrake | 320/13 X |
| 4,902,956 | 2/1990 | Sloan | 320/13 |
| 4,950,913 | 8/1990 | Kephart | 307/10.7 |

FOREIGN PATENT DOCUMENTS

| | | |
|---|---|---|
| 144730 | 9/1985 | Japan . |
| 61566 | 4/1987 | Japan . |
| 62-74455 | 5/1987 | Japan . |
| 47153 | 3/1989 | Japan . |

*Primary Examiner*—R. J. Hickey
*Attorney, Agent, or Firm*—Sughrue, Mion, Zinn, Macpeak & Seas

[57] ABSTRACT

A vehicle having an engine starter requires a huge amount of electric power so that when the remaining capacity of the battery is low, the engine starter cannot start the engine quickly. In order to maintain a minimum capacity of the battery necessary to start the engine quickly, an electric power supply apparatus is provided which includes a switching device for stopping a vehicle engine, a timer device for measuring elapsed time after engine stoppage, a capacity detector for detecting remaining capacity of a battery, vehicle equipment driven by the electric power from the battery, a switching member for turning off the power supplied from the battery to the vehicle equipment and a control device for controlling the switching member when the capacity of the battery is below a certain level and the timer device measures the elapsed time.

4 Claims, 3 Drawing Sheets

VEHICLE POWER SUPPLY APPARATUS FOR PROTECTING A BATTERY FROM EXCESSIVE DISCHARGE

BACKGROUND OF THE INVENTION

The present invention relates to a power supply apparatus for a vehicle telephone, a vehicle facsimile and the like.

Japanese Laid Open Patent Publication 62-74455 discloses a power supply apparatus for a vehicle. The conventional power supply apparatus comprises a battery for supplying electric power to vehicle equipment, a capacity detector for detecting remaining capacity of the battery, a switching member for turning off the power supplied from the battery to the vehicle equipment and a control unit for controlling the switching member while the capacity of the battery is below a certain level. According to the conventional apparatus, the battery is protected from excessive discharge.

However, it is very hard to detect the remaining capacity of the battery accurately. When battery fluid is dense, the remaining capacity of the battery seems to be higher than the actual capacity. Contrary to this, when the battery fluid is thin, the remaining capacity of the battery seems to be lower than the actual capacity. Thus, the remaining capacity of the battery is sometimes erroneously detected and the battery may be excessively discharged.

A vehicle has an engine starter which requires a huge amount of electric power. When the remaining capacity of the battery is low, the engine starter cannot start the engine quickly.

SUMMARY OF THE INVENTION

Accordingly, one of the objects of this invention is to obviate the above conventional drawbacks.

Another object of this invention is to be able to start an engine quickly.

A further object of this invention is to be able to use vehicle equipment in a limited manner.

A still further object of this invention is to conserve electric power of a vehicle battery.

To achieve the above objects of this invention, an electric power supply apparatus comprises a switching means for stopping an engine, a timer means for measuring elapsed time after the engine stoppage, a capacity detector for detecting remaining capacity of a battery, vehicle equipment driven by electric power from the battery, a switching member for turning off the power supplied from the battery to the vehicle equipment and a control means for controlling the switching member while the capacity of the battery is below a certain capacity and while the timer means measures elapsed time. After the switching means detects engine stoppage, the control means turns on the switching member so as to supply electric power to vehicle equipment. When the remaining capacity of the battery is below a certain capacity, the control means turns off the switching member so as to cut off vehicle equipment from the battery. Further, when the timer means measures a certain elapsed time, the control means turns off the switching member so as to cut off vehicle equipment from the battery. Thus, the battery is reliably protected from excessive discharge.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
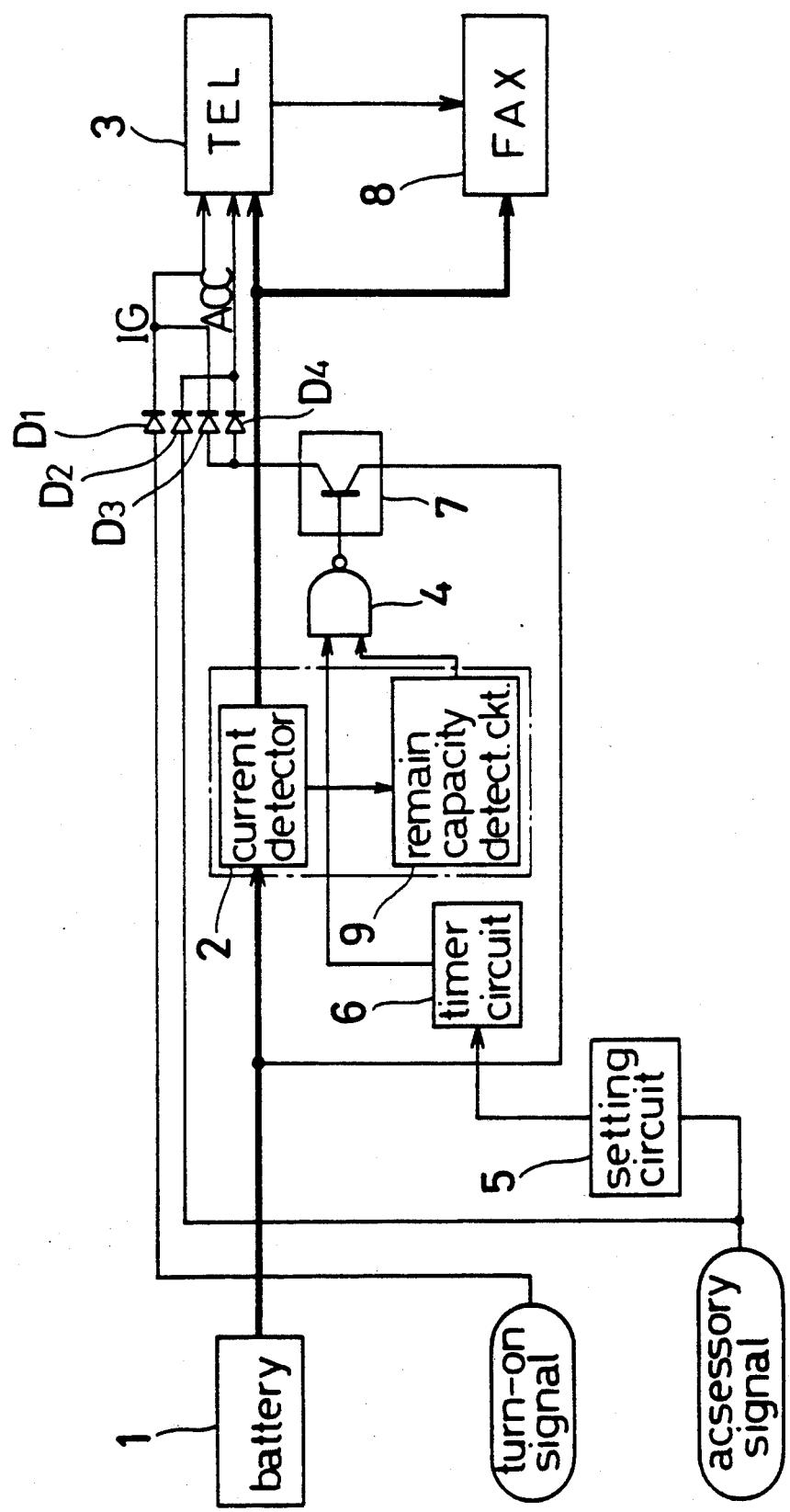
FIG. 1 is a block diagram showing a power supply apparatus of this invention.

FIG. 1 shows a circuit diagram of a preferred embodiment of this invention. A vehicle battery is a rechargeable lead-acid battery which is well known in the art. The battery 1 is used for starting a vehicle engine. Further, electric power of the battery is supplied to a vehicle telephone 3 and a facsimile 8 through a current detector 2. The turn-on signal of an ignition switch (not shown) is applied to the telephone 3 through a diode D1. The accessory signal of the ignition switch is applied to the telephone 3 through a diode D2. The accessory signal of the ignition switch is also applied to a setting circuit 5 for initiating limited power supply from the battery 1 to the telephone 3 and the facsimile 8.

While the vehicle engine is running, both the turn-on signal and the accessory signal are generated by the ignition switch (not shown). While the vehicle engine is stopped but the vehicle radio is operated, only the accessory signal is generated by the ignition switch. When the engine and the radio are stopped, both the turn-on signal and the accessory signal disappear.

An output signal of the setting circuit 5 is applied to a timer circuit 6. The timer circuit 6 measures an elapsed time and generates an "H" level signal for a certain period of time. In this embodiment, the timer circuit 6 generates an "H" level signal for 2 hours after the timer circuit 6 is set by the setting circuit 5.

An output signal of the current detector 2 is applied to a remaining capacity detecting circuit 9. The remaining capacity detecting circuit 9 determines the remaining capacity based on the current value and the voltage drop at the current detector 2.

The vehicle telephone 3 includes a radio transmitter and receiver. While the turn-on signal and the accessory signal are generated, the vehicle telephone 3 can be used based on the electric power which is supplied through the current detector 2. Further, the facsimile 8 can also be used based on the electric power supplied from the current detector 2. The facsimile 8 is operated depending on the vehicle telephone 3. The output signals of the timer circuit 6 and the remaining capacity detecting circuit 9 are applied to a switching circuit 7 through a 'NAND' gate 4. An output signal of the switching circuit 7 supplies electric power from the battery 1 to the vehicle telephone 7 through diodes D3 and D4. These diodes D3 and D4 are in parallel with the diodes D1 and D2 so that the switching circuit 7 simulates the turn-on and accessory signals of the ignition switch. Accordingly, while the turn-on signal and accessory signal are not applied to the vehicle telephone 3, the vehicle telephone 3 and the facsimile 8 can be used as long as both the timer circuit 6 and the remaining capacity detecting circuit 9 generate "H" signals.

Figure 2:
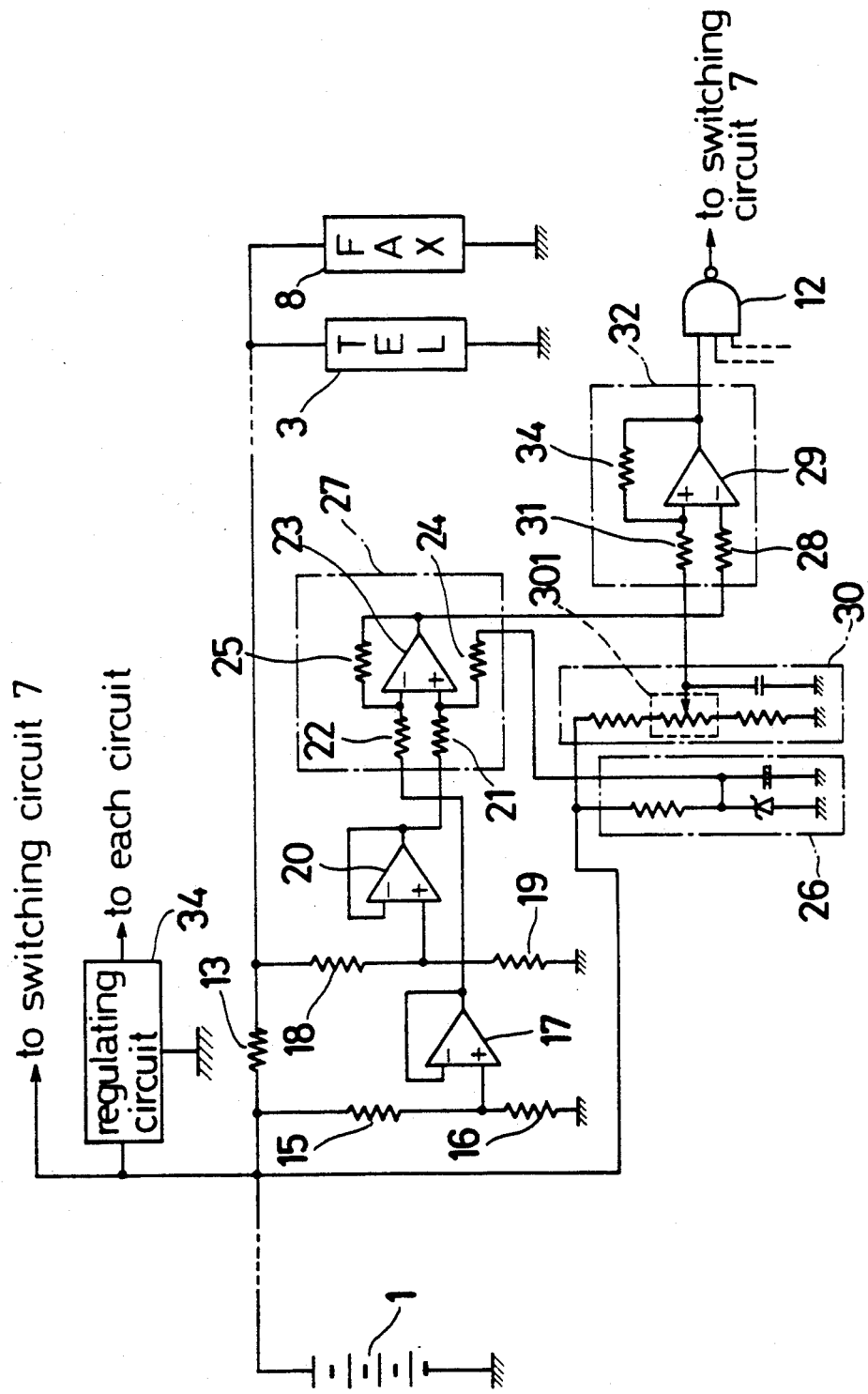
FIG. 2 is a circuit configuration of one part of the power supply apparatus shown in FIG. 1.

FIG. 2 is a circuit configuration showing the current detector 2 and the remaining capacity detecting circuit 9. A voltage regulating circuit 34 is connected to the battery 1. The voltage regulating circuit 34 supplies regulated electric power to voltage followers 17, 20, a differential amplifier 23 and a comparator 29. An output voltage of the battery 1 is applied to a voltage adjusting circuit 30. The voltage adjusting circuit 30 divides the output voltage of the battery 1, and generates a voltage lower than the battery output. The output voltage of the voltage adjusting circuit 30 changes in proportion to the output voltage of the battery 1. The voltage adjusting circuit 30 includes a variable resistor 301 which is used for determining a final discharge voltage of the battery 1. The variable resistor 301 is adjusted according to discharging characteristics of the battery 1 so that the proper final voltage is maintained.

An output signal of the voltage adjusting circuit 30 is applied to the non-inverted input of the comparator 29. The output signal of the voltage adjusting circuit 30 acts as the reference voltage to the comparator 29. The remaining capacity of the battery 1 is discriminated by a judging circuit 32 which includes resistors 28, 31, 34 and the comparator 29.

The judging circuit 32 generates an "H" signal while the output voltage of the voltage adjusting circuit 30 is higher than an output voltage of an adding circuit 27. The "H" signal indicates that the remaining capacity of the battery 1 is sufficient to start the engine quickly. The judging circuit 32 generates an "L" signal while the output voltage of the voltage adjusting circuit 30 is lower than the output voltage of the adding circuit 27. The "L" signal indicates that the remaining capacity o the battery 1 is too low to start the engine quickly.

When the vehicle telephone 3 or facsimile 8 requires a huge amount of electric power, the output voltage of the battery 1 is dropped due to internal resistance of the battery 1. On the contrary, when the vehicle telephone 3 or facsimile 8 requires a small amount of electric power, the output voltage of the battery 1 rises due to internal resistance of the battery 1. Therefore, the remaining capacity of the battery 1 is not accurately detected only by the output voltage of the battery 1.

In this embodiment, the output voltage of the adding circuit 27 is changed in accordance with the electrical current value in order to compensate the voltage drop due to the internal resistance of the battery 1.

The electrical current which flows through the vehicle telephone 3 and the facsimile 8 generates a voltage drop at the resistor 13. The amount of the voltage drop at the resistor 13 is in proportion to the electric current value which flows through the vehicle telephone 3 and the facsimile 8. The voltage drop is divided at one end of the resistor 13 by the resistors 15, 16 and applied to the voltage follower 17. Further, the voltage drop is divided at the other end of the resistor 13 by the resistors 18, 19 and applied to the voltage follower 20. The voltages which are supplied from the voltage followers 17, 20 are applied to the differential amplifier 23 through the resistors 21, 22. Further, a constant voltage generator 26 is connected to the non-inverted input of the differential amplifier 23 through the resistors 24. The adding circuit 27 comprises the resistors 21, 22, 24, 25 and the differential amplifier 23. Thus, the reference voltage Vout which is generated by the differential amplifier 23 is defined by formula 1:

$$Vout = a(-Vi1 + Vi2) + Vi3 \quad (1)$$

where a: gain of the adding circuit 27

Vi1: output voltage of voltage follower 17
Vi2: output voltage of voltage follower 20
Vi3: output voltage of constant voltage generator 26

When a large current flows to the vehicle telephone 3 and the facsimile 8, a large voltage drop is generated at the resistor 13.

Then the difference between the voltages Vi1 and Vi2 are increased and the reference voltage which is generated by the adding circuit 27 is decreased. On the contrary, when a small current flows to the vehicle telephone 3 and the facsimile 8, a small voltage drop is generated at the resistor 13. Then the difference between the voltages Vi1 and Vi2 is decreased and the reference voltage which is generated by the adding circuit 27 is increased.

Thus, when a large current flows through the vehicle telephone 3 and the facsimile 8, the output voltage of the battery 1 is decreased due to the internal resistance. However, the reference voltage is also decreased in proportion to the large current. Thus, the judging circuit 32 accurately determines the remaining capacity of the battery 1. When a small current flows through the vehicle telephone 3 and the facsimile 8, the output voltage of the battery 1 is increased due to the internal resistance. However, the reference voltage is also increased in proportion to the small current. Thus, the judging circuit 32 accurately determined the remaining capacity of the battery 1.

Figure 3:
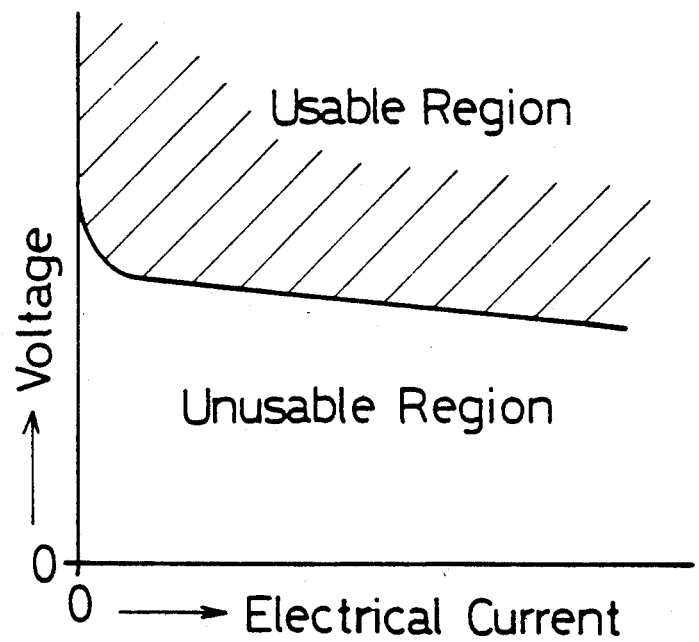
FIG. 3 is a graph showing a usable region of the power supply apparatus of this invention.

As described above, the voltage drop of the battery 1 is compensated by the reference voltage which is changed in proportion to the current level. As shown in FIG. 3, the vehicle telephone 3 and the facsimile 8 can be used in the oblique lined region in this embodiment.

When the ignition switch (not shown) is turned on, the battery 1 is charged by an alternator which is driven by the vehicle engine. At this time, the turn-on signal is supplied to the vehicle telephone 3 through the diode D1. Further, the accessory signal is also supplied to the vehicle telephone 3 through the diode D2. The electric power is supplied from the battery 1 to the vehicle telephone 3 and the facsimile 8 through the current detector 2. Thus, the usual telephone communication, facsimile transmission and facsimile receipt can be used.

When the ignition switch and accessory switch are turned off, the battery 1 is no longer being charged. At this time, the turn-on signal and the accessory signal disappear. The diodes D1, D2 are turned off due to a reverse biased voltage. When the accessory signal disappears, the output signal of the setting circuit 5 reverses to "H" level. The "H" level signal starts the timer circuit 6. Normally, the output of the remaining capacity detecting circuit 9 is "H" level at this moment. The output of the timer circuit 6 turns on the switching circuit 7 through the 'NAND' gate, and makes the telephone 3 and facsimile 8 usable.

After 2 hours, the output of the timer circuit 6 is reversed to the "L" level. At this moment, the 'NAND' gate 4 is closed and the switch circuit 7 is turned off. Then the telephone 3 and the facsimile 8 do not use too much electric power. Similar to this, when the remaining capacity detecting circuit 9 detects that the remaining capacity of the battery is below a certain capacity, the 'NAND' gate 4 is closed, and the switch circuit 7 is turned off. Then the telephone 3 and the facsimile 8 do not use too much electric power.

As described above, the telephone 3 and the facsimile 8 can be used in a limited manner after turning off the ignition switch. Therefore, electric power in the battery 1 can be conserved in order to start the engine quickly.

While the invention has been particularly shown and described with reference to preferred embodiments thereof, it will be understood by those in the art that the foregoing and other changes in form and details may be made therein without departing from the spirit and scope of the invention.

What is claimed is:

1. An electric power supply apparatus comprising:
    switching means for stopping a vehicle engine;
    timer means for measuring an elapsed time after engine stoppage;
    setting means for activating said timer means in response to operation of said switching means;
    a capacity detector for detecting remaining capacity of a battery;
    a vehicle equipment driven by electric power from the battery;
    a switching member for turning off the power supplied from the battery to the vehicle equipment, and
    control means including a "NAND" gate connected to said timer means and said capacity detector and having an output connected to the switching member for controlling the switching member to turn off power from the battery to the vehicle equipment when the capacity of the battery is below a certain capacity or after the timer means measures the elapsed time.

2. An apparatus as set forth in claim 1, wherein the vehicle equipment is a vehicle telephone.

3. An apparatus as set forth in claim 1, wherein the vehicle equipment is a vehicle facsimile.

4. An apparatus as set forth in claim 1, wherein the capacity detector further comprises:
    means for detecting a current, and
    means for determining the capacity of the battery based on the detected current.

* * * * *